May 29, 1951 — O. J. POUPITCH — 2,555,291
FASTENER UNIT
Filed Nov. 9, 1945 — 2 Sheets-Sheet 1
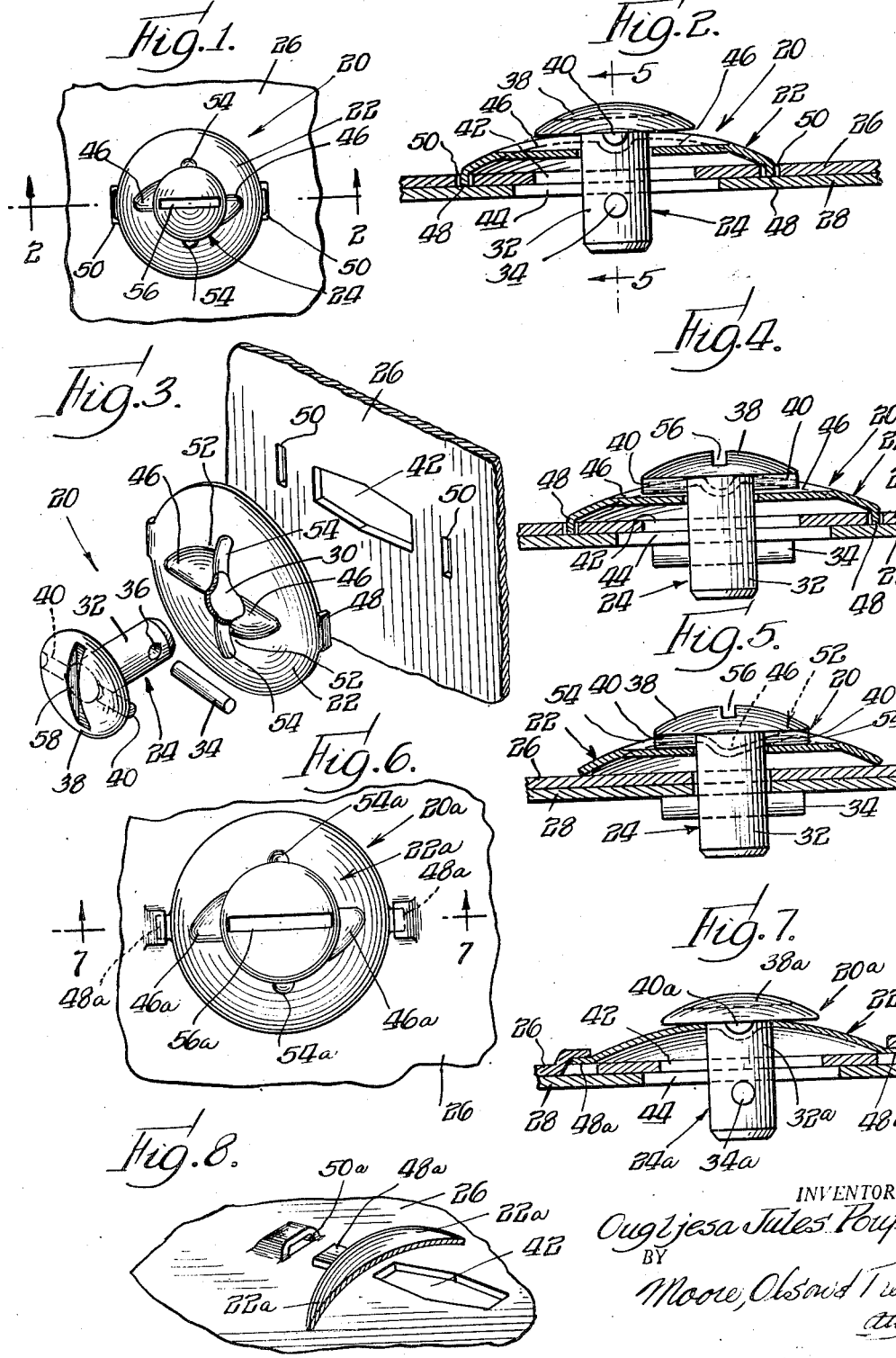
INVENTOR.
Ougljesa Jules Poupitch
BY Moore, Olson & Trexler
Attys.

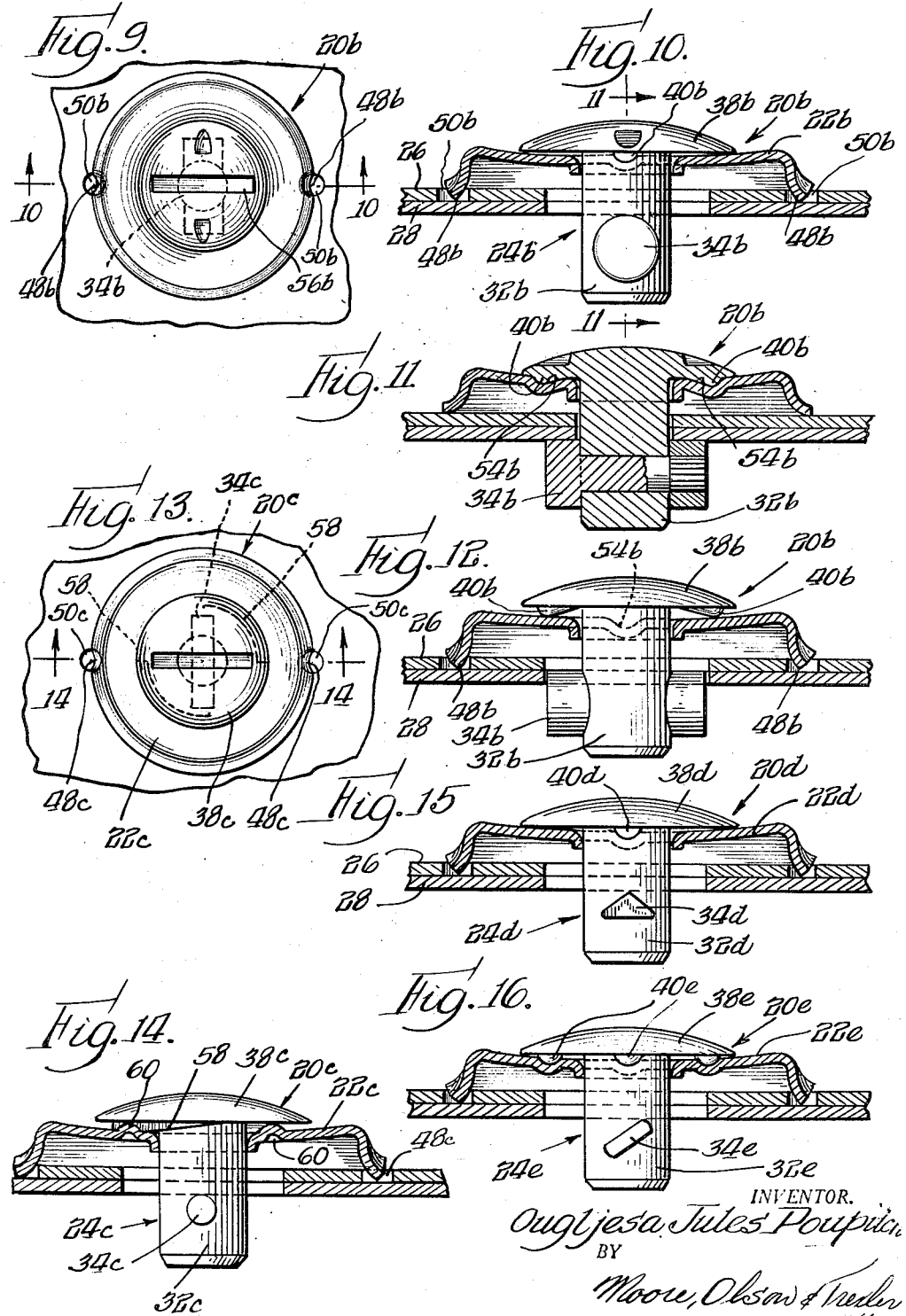

Patented May 29, 1951

2,555,291

UNITED STATES PATENT OFFICE 2,555,291

FASTENER UNIT

Ougljesa Jules Poupitch, Chicago, Ill., assignor to Illinois Tool Works, Chicago, Ill., a corporation of Illinois Application November 9, 1945, Serial No. 627,664

8 Claims. (Cl. 24—221)

This invention relates generally to quickly operable fastener devices, and more particularly to quickly operable fastener units comprising a spring fastener member secured against axial separation with respect to a stud shank.

The present invention is primarily concerned with the production of a fastener unit in which one element consists of a headed stud member having a peripheral lug on its shank portion, and a spring stud locking member or washer mounted on the stud shank between said head and lug. Fasteners of this type permit work pieces to be firmly secured, one against the other, by partial rotation of the stud. Heretofore it has been common practice to employ quickly operable fasteners, known particularly in the aviation industry as cowl fasteners. In the use of cowl fasteners a spring fastening part, frequently constructed of sheet metal, is secured to a supporting work piece, and a removable stud member may be inserted through the fixed spring member so as to effect interlocking of the lug on the stud member with a cam surface on the spring member. In other words, the stud member in these prior devices was carried by one work part and the stud locking spring carried by the other work part in such manner as to permit detachment of the stud and spring member when one of the work pieces was separated from the other work piece. The present invention proposes to eliminate many of the defects and inconveniences resulting from the use of the aforesaid cowl fastener arrangements.

More specifically the present invention contemplates a fastener unit as set forth above which positively eliminates separation of the stud and its complementary locking spring and at the same time enables the stud shank to be inserted through registering apertures in work pieces, and by imparting rotation of approximately 90° the stud and spring will function to firmly secure the work pieces together.

It is an object of the present invention to provide a preassembled stud and washer of extremely simple and practical construction, wherein the washer is a simple dished structure and the stud is provided with a plain shank having a head at one end and lug means at the opposite end spaced from the inner side of the dished washer a sufficient distance to accommodate a work piece therebetween.

It is a further object of the present invention to provide a fastener unit or preassembled stud and spring washer in which the washer member may be secured against relative rotation with respect to an adjacent work piece, and in which interlocking means between the clamping side of the stud head and the adjacent surface of the spring member or washer serve to secure said parts against unauthorized or unintentioned relative rotation.

Still a further object of the present invention is to provide, in combination with a quickly operable fastener unit of the type referred to above, a work structure having an elongated aperture for accommodating the lateral lug of the stud shank to permit telescopic association of the shank with the work, so that upon subsequent partial rotation said lug will cooperate with the spring member on the opposite side of the work in securing the parts together.

The foregoing and other objects and advantages will be more apparent from the following detailed description when considered in connection with the accompanying drawings wherein:

Fig. 1 is a plan view of a fastener unit constructed in accordance with the teachings of the present invention, shown in operative association with a work piece;

Fig. 2 is a central transverse vertical sectional view taken substantially along the line 2—2 of Fig. 1, showing the fastener stud in its work clamping position;

Fig. 3 is a perspective view of the parts of Fig. 2 disclosing said parts in exploded relation;

Fig. 4 is a sectional view similar to Fig. 2 disclosing the position taken by the stud when it is initially inserted through the registering apertures of the work;

Fig. 5 is a sectional view taken substantially along the line 5—5 of Fig. 2 showing the fastener stud turned to its work clamping position;

Fig. 6 is a plan view similar to Fig. 1 disclosing a slightly modified arrangement wherein the spring or washer element is provided with radially extending tabs as distinguished from the axially extending tabs shown in Figs. 1 to 4, inclusive;

Fig. 7 is a vertical transverse sectional view taken substantially along the line 7—7 of Fig. 6;

Fig. 8 is a fragmentary perspective view showing the manner in which the radial tabs of the resilient or spring locking member of Figs. 6 and 7 cooperate with a pocket provided in the work piece to secure the parts against relative movement;

Fig. 9 is a plan view of a fastener unit of slightly modified form shown in operative association with the work piece;

Fig. 10 is a vertical sectional view taken substantially along the line 10—10 of Fig. 9;

3

Fig. 11 is a vertical central sectional view taken substantially along the line 11—11 of Fig. 10;

Fig. 12 discloses the fastener unit of Figs. 10 and 11 as the shank thereof is initially inserted within the work and prior to the tightening thereof;

Fig. 13 is a plan view of a slightly modified fastener unit arrangement;

Fig. 14 is a central vertical sectional view taken substantially along the line 14—14 of Fig. 13;

Fig. 15 is a vertical sectional view similar to Fig. 10 disclosing a stud member having a modified lug of triangular cross section; and Fig. 16 is a view similar to Fig. 15 disclosing a lug of rectangular cross section.

Referring now to the drawings wherein like numerals have been employed to designate similar parts throughout the various figures, it will be seen that one embodiment of the present invention constitutes a fastener unit designated by the numeral 20, Figs. 1 to 5, inclusive. The fastener unit 20 includes a spring stud locking member or dished washer 22 and a complementary stud member 24. The spring or washer member 22 is dished to provide sufficient resiliency to enable the stud member 24 to clamp work pieces 26 and 28 together in a manner hereinafter to be described. The central portion of the washer member 22 is provided with an aperture 30 for accommodating the shank portion 32 of the stud 24. The shank 32 is preferably slightly smaller than the aperture 30 in order to enable quick telescopic assembly of the parts.

The stud 24 is equipped with a cross pin or lug means 34. While in the disclosed embodiment this lug means 34 constitutes a pin which is inserted through an aperture 36, Fig. 3, in the stud shank, other forms of laterally extending lug members may be incorporated without departing from the present invention. On the underside of the head 38 of the stud member 24 is a pair of radially extending lugs or protuberances 40. These protuberances 40 have a rounded undersurface and may be formed integral with the stud body simultaneously with the heading of the stud. In Fig. 4 these protuberances 40 are disclosed in the positions which they initially occupy when the entering end of the stud is inserted through complementary elongated registering apertures 42 and 44 in the work pieces 26 and 28, respectively. The area of the washer occupied by the protuberances 40 during the initial positioning thereof is designated generally by the numeral 46. It will be noted that when the stud occupies its aforesaid initial position within the work pieces 26—28, Fig. 4, the surface of the lug means or cross pin 34 facing the stud head lies in a plane substantially coincident with the plane of the outer surface of the work piece 28. At this point it will be understood that the telescopic assembly of the stud and washer member is made prior to the insertion of the cross pin 34 into its complementary aperture 36. Thus the cross pin or lug means 34 projects sufficiently beyond the periphery of the stud shank 32 so as to cooperate with the stud head 38 in securing the washer member 22 and stud member 24 against axial separation when disassociated from the work.

When the stud member 24 and associated washer member 22 are initially brought into association with the work pieces 26 and 28, as previously described, a pair of diametrically opposed ears or lugs 48 formed integral with the outer margin of the washer is positioned in interlocking relation with complementary apertures 50 in the work piece 26. This arrangement serves to secure the washer against relative rotation with respect to the work piece 26 when rotation is subsequently imparted to the stud 24. As the stud is rotated from the initial position of insertion shown in Fig. 4, lug means or oppositely disposed extremities of the cross pin 34 project beyond the aperture 44 in the work piece 28 so as to prevent upward or outward displacement of the stud, and the protuberances 40 move along cam surfaces which extend from the above mentioned low point 46 to a high point 52. The stud is rotated in a clockwise direction as viewed from the top of Figs. 1, 2, 4 and 5. This camming action causes the washer 22 to be subjected to axial stress, and thus the two work pieces 26 and 28 are securely and resiliently clamped together. As the extremities of the cross pin 34 leave the high point 52 of the cam the protuberances 40 lockingly snap into position within indentations or depressions 54. In this position the protuberances 40 interlock with their complementary depressions 54 of the washer so as to secure the stud 24 against inadvertent or unauthorized retrograde rotation. In this manner the spring member or washer 22 and the lug means 34 cooperate in enabling a very quick and positive assembly of work pieces. A suitable tool accommodating slot 56 is provided in the stud head 38 for receiving the blade of a turning tool, such as a screw driver.

From the foregoing it will be apparent that the invention contemplates a fastener unit in which a spring member such as a dished washer is secured against axial separation from a stud member by the head at one extremity of the stud shank and a lateral lug at the other extremity. In the embodiment of the invention described, axial stressing of the spring member results from the engagement of the lug beneath the stud head with a cam surface on the washer part. It will also be apparent that a fastening device of the type described above operates very quickly in securing work pieces together. That is to say, the mere insertion of the stud within the elongated opening of the work and the subsequent partial rotation of the stud establishes a firm connection. By having the spring member or washer always available with its companion stud member, the ease with which a fastening may be accomplished is materially facilitated.

In Figs. 6 to 8, inclusive, a slightly modified fastener unit construction is disclosed. This fastener unit is designated generally by the numeral 20a. The spring member or washer 22a is identical with the washer 22 previously described with the exception that lugs 48a project radially outward from the outer margin of the washer member as distinguished from the previously described lugs 48 which extend axially from the washer member. The lugs 48a are adapted to be sprung into pockets 50a struck out from the work piece 26. The stud 24a is similar in all respects to the stud 24 previously described. All of the constituent parts of the fastener unit 20a corresponding to similar parts of the fastener unit 20 have been given numerals with the letter "a" associated therewith. When the fastener unit 20a is initially associated with the work pieces 26—28, the lugs 48a are forced into the complementary openings or pockets 50a. These lugs 48a and pockets 50a cooperate to secure the spring member or washer 22a against rotation during the tightening of the stud member 24a.

In Figs. 9 to 12, inclusive, a slightly modified fastener unit is disclosed which is designated generally by the numeral 20b. This fastener unit functions similarly to the fastener units previously described, and employs a spring member or washer 22b of slightly modified cross section. The washer 22b incorporates a body portion which is spaced from and substantially parallel with the plane of the work piece, and lugs 48b interlock with companion apertures 50b in securing the washer against rotation during the tightening of the stud member 24b. The fastener unit 20b differs from the previously described fastener units in that the cam surface has been eliminated from the washer member. The stud head 38b is provided with a pair of diametrically opposed struck-out lugs 40b adapted to interlock with companion indentations 54b in securing the stud member against unintentioned or unauthorized retrograde rotation after it has been tightened in place.

The flexing or stressing of the central portion of the spring member 20b is accomplished through the agency of a relatively large cross pin or lug means 34b. One embodiment of the cross pin 34b consists of two parts, one a headed shank and the other a collar swaged onto the shank which is serrated at one extremity. When the stud 24b and its preassembled washer member 22b are initially applied to the work pieces, as illustrated in Fig. 12, the cross pin 34b does not clear the work piece 28. However, subsequent rotation of the stud member causes the cross pin 34b to exert a camming action against the work piece 28, thereby causing the downward flexing of the washer member to the position illustrated in Figs. 10 and 11. In this position the protuberances or lugs 40b lockingly register with the indentations 54b. In this position the work pieces are securely clamped together and the stud is locked against inadvertent retrograde rotation. The central portion of the washer 22b which surrounds the stud accommodating opening is provided with a strengthening flange or shoulder, as shown.

In Figs. 13 and 14 a still further modification of a fastener unit is shown. This fastener unit is designated by the numeral 20c, and incorporates a spring or washer member 22c and a stud member 24c. It will be noted that the stud member 24c is provided with a cam member 58 on the underside of the stud head. In Figs. 1 to 8, inclusive, the spring member or washer embodies a cam surface, and in Figs. 9 to 12, inclusive, the camming action resulted from the engagement of the cross pin with the work piece; whereas, in Figs. 13 and 14 the camming action results from the engagement of a cam on the stud with a protuberance 60 on the washer member. In all other respects the fastener unit 20c conforms structurally with the fastener units previously described, and corresponding numerals have been used to disclose the constituent parts thereof. It will be noted that the protuberances 58 beneath the head 38c is provided with a depression which cooperates with the protuberances 60 in securing the stud against retrograde rotation.

In Fig. 15 a fastener unit is disclosed which is designated generally by the numeral 20d. This fastener unit includes a spring or washer member 22d and a rotary stud 24d. The only structural difference between the fastener unit 20d and fastener unit 20b is that the fastener unit 20d incorporates a modified cross pin or lug means 34d. This lug means or cross pin 34d is triangular in cross section, and thereby provides a cam surface which cooperates with the work piece 28 in the same manner that the enlarged cross pin 34b coacts with the work piece 28.

Fig. 16 discloses a modified fastener unit designated generally by the numeral 20e. This fastener unit 20e incorporates a spring member or dished washer 22e and a stud member 24e. A cross pin or lug means 34e is of rectangular cross section and inclined to provide a cam surface. The underside of the stud head 38e is provided with a series of protuberances 40e designed to cooperate with complementary depressions in the washer body, so as to secure the stud against inadvertent loosening. The cross pin 34e of rectangular cross section, like the cross section 34d of triangular cross section and the cross pin 34b of cylindrical cross section, coacts with the work piece 28 to cause lateral deflection of the central portion of the washer. In Figs. 15 and 16 the fasteners are disclosed in locked position.

From the foregoing it will be apparent that the present invention contemplates a fastener unit of extremely simple, yet practical, construction. By preassembling a dished or spring washer member between a stud head and a work engaging protuberance axially spaced therefrom, the ease and speed with which work pieces may be assembled are materially enhanced. Heretofore in the use of fasteners requiring only partial rotation to secure them in position, the sheet metal or spring member was secured to the work piece as a separate element. The present invention makes it possible to assure a spring member or washer to be equipped with a locking stud of proper size, shape and design. By having the lateral lug means or cross pin on the stud spaced axially from the outer margin of the washer a predetermined distance, which is correlated with the thickness of the work for which the fastener is to be used, positive locking is assured. That is to say, the provision of a fastener unit comprised of the two matched locking parts, namely, the preassembled spring or washer member and the stud member, assures the use of a fastener which is specifically designed for a specific application. In the use of fastener studs designed for partial rotation to effect locking, considerable difficulty has heretofore been experienced because of the failure to employ a stud of the proper size and design for the spring locking part carried by the work piece. The present invention eliminates the necessity of securing a spring locking part to the work piece, and at the same time positively precludes the use of the wrong stud or the wrong spring fastener part. It will also be clear that the present invention provides a captive washer arrangement, wherein a plain shank of a stud member and the aperture of the washer are substantially equal, so as to enable the head at one extremity of the stud shank and lug means at the opposite extremity of said shank to cooperate in securing the parts against axial separation.

Obviously, for purposes of illustration, various embodiments have been disclosed herein, but it will be understood that modifications and changes may be made without departing from the spirit and scope of the appended claims.

The invention is hereby claimed as follows:

1. A quickly operable fastener unit comprising a permanently preassembled stud member and locking washer, said washer comprising a generally annular dished resilient member having a central stud accommodating opening, said stud member comprising a shank having a head at one end provided with means to facilitate turning of the shank, a holding lug axially spaced from said head and extending radially outwardly from the shank periphery, the washer encircling the stud shank between the stud head and lug with the crown portion thereof extending toward and adapted to be engaged by the head, cooperating interlocking means on the stud head and washer crown for securing the washer and stud in fixed relation when the stud is rotated to a given position in a complementary work piece, and integral means at the outer margin of the washer adapted to lockingly engage and secure the washer against rotation with respect to a complementary work surface, the disposition of the washer on the stud being such that when the stud head is in engagement with the washer crown, the distance between the outer margin of the washer and the lug will be less than the thickness of the work to be clamped therebetween.

2. A quickly operable fastener unit in accordance with claim 1, wherein the lug is provided with a cam surface on the side thereof facing the stud head.

3. A quickly operable fastener unit in accordance with claim 1, having cam means to facilitate interlocking of the stud head and washer crown.

4. A quickly operable fastener unit in accordance with claim 1, wherein the washer is provided with a cam surface adapted to be engaged by the clamping side of the stud head.

5. A quickly operable fastener unit in accordance with claim 1, wherein the integral means at the outer margin of the washer for lockingly engaging a complementary work structure comprises a plurality of lugs.

6. A quickly operable fastener unit in accordance with claim 5, wherein the lugs extend axially from the outer margin of the washer in a direction away from the washer crown.

7. A quickly operable fastener unit in accordance with claim 5, wherein the lugs extend radially outwardly from the outer margin of the washer.

8. A quickly operable fastener unit in accordance with claim 1, wherein the outer margin of the washer provides a work engaging area of substantially circumferential extent to provide an effective seal.

OUGLJESA JULES POUPITCH.

REFERENCES CITED

The following references are of record in the file of this patent:

UNITED STATES PATENTS

| Number | Name | Date |
| --- | --- | --- |
| 63,021 | Collins | Mar. 19, 1867 |
| 373,860 | Steffey | Nov. 29, 1887 |
| 642,777 | Roth | Nov. 10, 1891 |
| 545,278 | Fischer | Aug. 27, 1895 |
| 874,083 | Jonah | Dec. 17, 1907 |
| 1,798,526 | Fitzgerald | Mar. 31, 1931 |
| 1,857,530 | Dandridge et al. | May 10, 1932 |
| 2,260,048 | Newell | Oct. 21, 1941 |
| 2,278,062 | Koharovich | Mar. 31, 1942 |
| 2,373,722 | Von Opel | Apr. 17, 1945 |

FOREIGN PATENTS

| Number | Country | Date |
| --- | --- | --- |
| 61,400 | Switzerland | of 1912 |